| (12) | United States Patent | (10) Patent No.: | US 8,478,867 B1 |
|---|---|---|---|
| | Queru | (45) Date of Patent: | Jul. 2, 2013 |

(54) DYNAMIC AUDIO NOTIFICATIONS

(75) Inventor: Jean Baptiste Maurice Queru, Foster City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/566,028

(22) Filed: Aug. 3, 2012

Related U.S. Application Data

(60) Provisional application No. 61/522,373, filed on Aug. 11, 2011.

(51) Int. Cl.
*G06F 15/16* (2006.01)

(52) U.S. Cl.
USPC .......................................... 709/224; 709/217

(58) Field of Classification Search
USPC ............................. 709/200–206, 217–227, 228
See application file for complete search history.

(56) References Cited

U.S. PATENT DOCUMENTS

| 6,393,296 | B1 * | 5/2002 | Sabnani et al. ............... 455/466 |
|---|---|---|---|
| 7,542,773 | B2 | 6/2009 | Koch |
| 7,904,516 | B2 * | 3/2011 | Chern ........................... 709/206 |
| 7,912,912 | B2 * | 3/2011 | Yuyama ........................ 709/206 |
| 8,135,392 | B2 * | 3/2012 | Marcellino et al. ........... 455/418 |
| 2005/0169285 | A1 | 8/2005 | Wills et al. |
| 2008/0146197 | A1 * | 6/2008 | Lim ........................... 455/412.2 |
| 2009/0083658 | A1 * | 3/2009 | Ito et al. ........................ 715/781 |
| 2009/0227294 | A1 * | 9/2009 | Ouchi et al. .................. 455/566 |
| 2011/0319141 | A1 * | 12/2011 | Miwa ............................ 455/567 |

\* cited by examiner

*Primary Examiner* — Moustafa M Meky

(74) *Attorney, Agent, or Firm* — Fish & Richardson P.C.

(57) ABSTRACT

Provided are methods and systems for providing dynamic audio notifications, as well as computer programs encoded on computer storage devices and configured to perform the actions of the methods. A notification application executing on a device receives data from another application. The notification application selects a rule associated with the other application, from among one or more rules, and applies the data to the selected rule. The notification application provides a notification based on applying the data to the selected rule, where the notification comprises at least two components, and where at least one of the at least two components is associated with the data.

18 Claims, 4 Drawing Sheets

DYNAMIC AUDIO NOTIFICATIONS

CROSS-REFERENCE TO RELATED APPLICATION

This application claims the benefit of U.S. Pat. App. No. 61/522,373, filed Aug. 11, 2011, which is incorporated herein by reference.

FIELD

The present application relates to dynamic audio notifications.

BACKGROUND

Audio notifications may be provided to a user of a computing device to enhance the user's experience. For example, upon receipt of an email, an email application may play an audio file to alert a user of a device that they have email.

SUMMARY

Audio notifications can provide a variety of information to users of computing devices, enhancing the user experience. For example, prewritten text may be converted into synthesized speech by concatenating individual elements of prerecorded audio, thereby enabling a user to listen to, rather than read, the text. Systems enabling the conversion of text into synthesized speech are known as "text-to-speech" (TTS) systems. TTS may be used, for example, to enhance the accessibility of computing devices for individuals suffering from dyslexia, visual impairments, or other disabilities.

A TTS system may generate static audio notifications based solely on prewritten text, or may generate dynamic audio notifications based on, for example, data other than prewritten text, or based on a combination of prewritten text and other data. In order to generate a dynamic audio notification, a TTS system may reference rules that define the handling of text and other data.

A TTS system can be implemented as a notification application that interacts with other applications of a computing device, thereby enhancing the user experience by providing dynamic audio notifications according to information received from the other applications. For example, upon receipt of an email, an email application may deliver data to a notification application, along with a rule. The notification application may then generate a dynamic audio notification by applying the data to the rule, alerting the user of the device that they have email, and providing the user with additional information relating to the contents of the email.

Although a dynamic audio notification may include synthesized speech elements, a notification application may also generate dynamic audio notifications that do not include synthesized speech elements. For example, upon determining a user's position, a navigation application may deliver data to a notification application, along with a rule. Based on the data and the rule, the notification application may then generate a dynamic audio notification including one or more non-speech audio elements, such as a tone indicating a distance from the user's present position to a destination.

A dynamic audio notification may also include non-audio elements. For example, a notification application may cause the display of an icon or other graphic on the screen of a computing device as part of providing a notification, or may generate haptic feedback. Other kinds of notifications are possible, and may involve multiple input/output devices.

According to one innovative aspect of the subject matter described by this specification, a notification application executing on a computing device such as a mobile device may receive data from another application. The notification application may select, from among one or more rules, a rule associated with the other application, and may apply the data to the selected rule. Based on the application of the data to the selected rule, the notification application may provide a notification. The notification may include an audio output, and may include a first part associated with predefined text and a second part associated with the data. Providing a notification based on applying the data to the selected rule may further include performing a text-to-speech operation on a result of applying the data to the rule.

According to another innovative aspect, the notification application may receive a rule from the other application. The notification application may, for example, receive the rule from the other application when the data is received. Selecting a rule associated with the other application may include selecting a rule associated with both the other application and with the data.

According to another innovative aspect, the selected rule may include predefined text, and/or may specify an action to be performed by the notification application. Applying the data to the selected rule may include determining a second data based on the data, and applying the second data to the selected rule. Determining the second data may, for example, include performing a lookup, and the lookup may be specified by the selected rule.

Certain implementations may provide various advantages. For example, notification applications configured to generate dynamic audio notifications based on data and rules received from other applications or sources can be used to flexibly deliver a variety of information to a user of a computing device, in a variety of contexts. For example, in some implementations the same notification application may be used to generate dynamic audio notifications based on data and rules received from several other applications, and each rule can be, but need not be, application specific. Furthermore, because the rules themselves may incorporate references to data elements other than prewritten text, the resulting audio notifications need not be predefined, and can convey context-dependent information to the user.

Other embodiments of these aspects include corresponding systems, apparatus, and computer programs, configured to perform the actions of the methods, encoded on computer storage devices.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
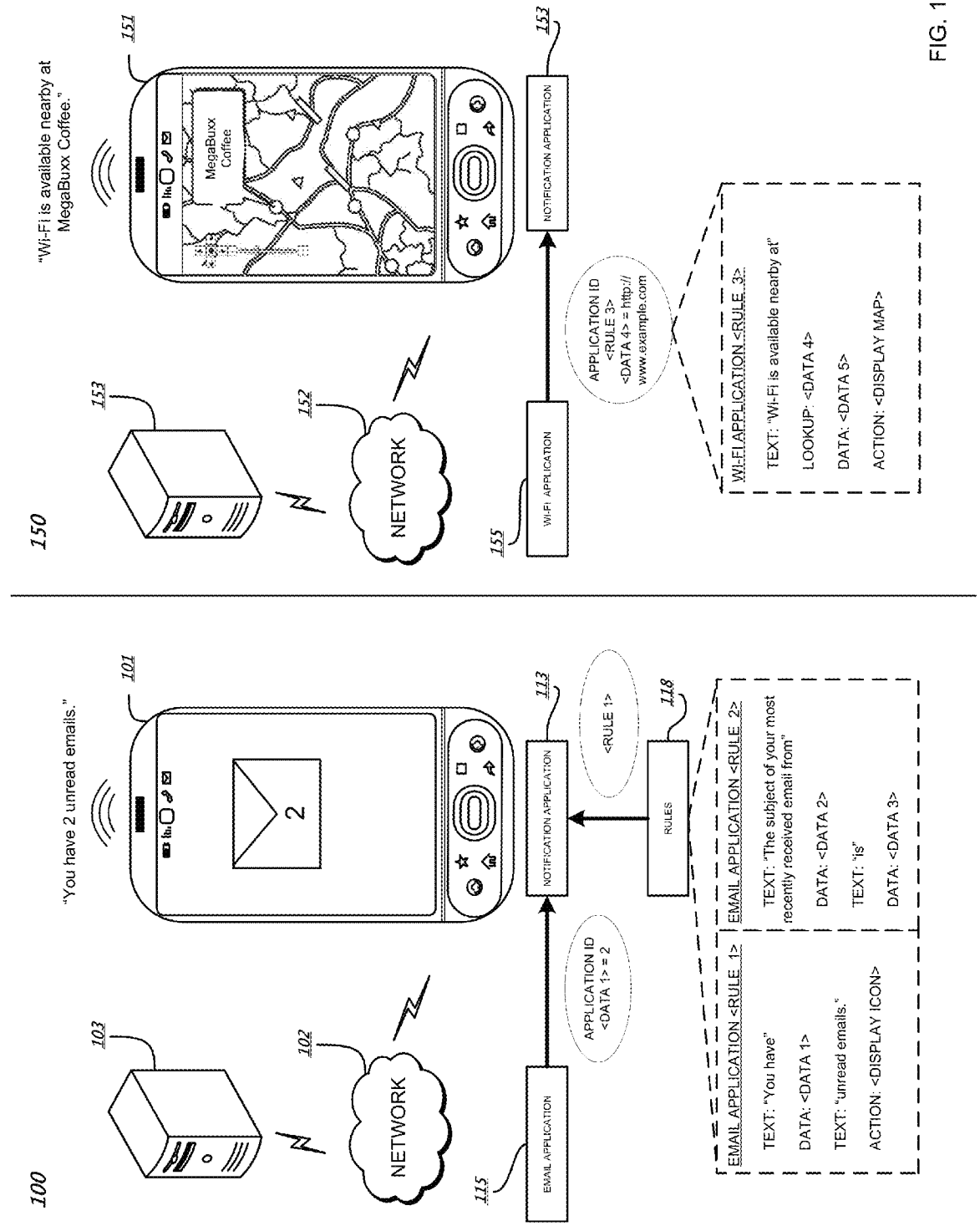
FIG. 1 shows examples of providing audio notifications to a user of a computing device.

FIG. 1 features examples 100 and 150 of providing audio notifications to a user of a computing device. In example 100, a notification application 113 of mobile computing device 101 provides the dynamic audio notification "You have 2 unread emails" based on the application of data to a selected rule.

Dynamic audio notifications can be used to provide a variety of information to users of computing devices, enhancing the user experience. A dynamic audio notification may include, for example, synthesized speech elements generated based on a combination of prewritten text and other data.

A notification application may be configured to interact with other applications in order to generate dynamic audio notifications. For example, a notification application may generate notifications based on information received from other applications. The notification application may receive one or more rules from another application, the rules specifying the handling of data by the notification application. The notification application may also receive data from another application, and may generate a dynamic audio notification based on the application of data to a rule.

In example 100, mobile computing device 101 communicates with a server 103 through one or more networks 102, and notification application 113 executing on mobile computing device 101 receives data from another application. Specifically, notification application 113 receives <DATA 1> having a value 2 from email application 115, along with an application ID identifying the application from which <DATA 1> was received. Based on the application ID, notification application 113 selects a rule associated with the other application from among one or more rules 118.

In example 100, rules 118 include email application <RULE 1> and email application <RULE 2>. Notification application 113 selects <RULE 1>, the rule associated with both email application 115, and with the received data, <DATA 1>.

Notification application 113 then applies <DATA 1> to the selected rule, <RULE 1>. <RULE 1> includes the predefined text "You have" and "unread emails," specifies the manner in which <DATA 1> can be applied, and specifies an action to be performed by notification application 113: <DISPLAY ICON>.

Based on the application of <DATA 1> to <RULE 1>, notification application 113 provides a notification. As part of providing the notification, notification application 113 performs a text-to-speech operation on a result of applying <DATA 1> to <RULE 1>, generating the audio output "You have 2 unread emails." Notification application 113 also performs, as part of providing the notification, the action specified in <RULE 1>, displaying an icon on the screen of mobile computing device 101.

In example 150, mobile computing device 151 communicates with a server 153 through one or more networks 152, and notification application 153 executing on mobile computing device 151 receives data from another application. Specifically, notification application 153 receives <DATA 4> specifying a URL, along with an application ID identifying the application from which <DATA 4> was received, as well as a rule, <RULE 3>. Based on the application ID, notification application 153 selects a rule associated with the other application, the received <RULE 3>.

Notification application then applies <DATA 4> to the selected rule. <RULE 3> includes the predefined text "Wi-Fi is available nearby at," specifies the manner in which <DATA 4> can be applied, and specifies an action to be performed by notification application 153: <DISPLAY MAP>.

In example 150, <RULE 3> specifies that <DATA 4> is applied as part of a lookup operation. The notification application 153 applies <DATA 4> to <RULE 3> by performing the specified lookup, determining an additional data, <DATA 5>, by looking up <DATA 5> at the URL specified by <DATA 4>. Notification application 153 then applies the determined data, <DATA 5>, to <RULE 3>.

Based on the application of <DATA 4> and <DATA 5> to <RULE 3>, notification application 153 provides a notification. As part of providing the notification, notification application 153 performs a text-to-speech operation on a result of applying <DATA 5> to <RULE 3>, generating the audio output "Wi-Fi is available nearby at MegaBuxx Coffee." Notification application 153 also performs, as part of providing the notification, the action specified in <RULE 3>, interacting with a map application of mobile computing device 101 by displaying a map on the screen of mobile computing device 101.

Figure 2:
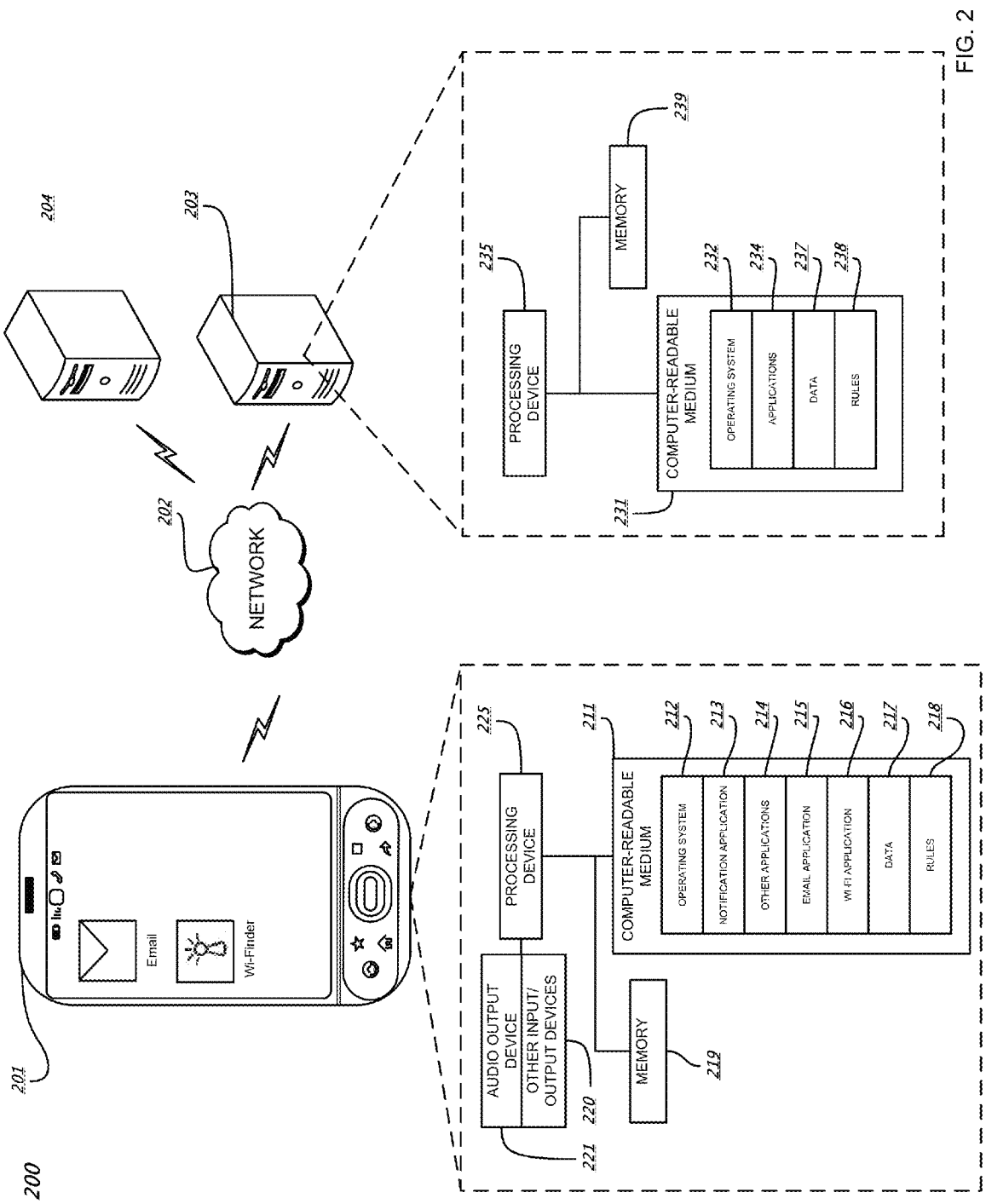
FIG. 2 features a diagram of an example system for providing audio notifications.

FIG. 2 features a diagram of an example system for providing audio notifications. Specifically, the system 200 includes a computing device 201 configured to run a notification application 213, which is configured to provide notifications based on data received from one or more other applications.

The one or more other applications may include, for example, email application 215, Wi-Fi application 216, and/or applications accessible to the computing device 201 through one or more networks 202, such as applications 245 contained on computer-readable medium 234 of computing device 203. The one or more other applications are separate from the notification application 213 and may be configured to provide a variety of functionality to computing device 201 when executed by computing device 201, or when accessed by an application of computing device 201.

The computing device 201 may be any type of computing device, such as a cellular phone, smart phone, personal data assistant, notebook computer, tablet computer, desktop computer or other computing device. The computing device 201 may include one or more processing devices 225, one or more input/output devices such as audio output device 221 and other input/output devices 220, and one or more computer-readable media such as computer-readable medium 211.

Computer-readable medium 211 may store notification application 213, data 217, and rules 218. Computer-readable medium 211 may also store one or more other applications 214. The computing device 101 may include hardware and software components in addition to the components listed here and depicted in FIG. 2.

The computing device 203 may be any computing device that includes one or more processors. The computing device 203 may be, for example, a server implemented in one or more devices, arranged as a stand-alone server, a server farm, or a server cluster. The computing device 203 may include hardware and software components in addition to the components listed here and depicted in FIG. 2.

The networks 202 may include a wireless cellular network, a wireless local area network (WLAN) or Wi-Fi network, a telephone network, a Third Generation (3G) or Fourth Generation (4G) mobile telecommunications network, a private network such as an intranet, a public network such as the Internet, or any appropriate combination thereof.

The notification application 213 may be configured to provide notifications to a user of computing device 201 using any of the input/output devices of the computing device 201. The notification application 213 may, for example, provide audio notifications through audio output device 221, and the audio notifications may include synthesized speech generated through the performance of a text-to-speech operation.

The notification application 213 may also provide notifications to the user of computing device 201 through other input/output devices 220. For example, notification application 213 may cause the display of an icon or other graphic on the screen of computing device 201 as part of providing a notification, or may generate haptic feedback. Other kinds of notifications are possible, and may be provided through multiple input/output devices of computing device 201.

When executing on computing device 201, notification application 213 may receive data, such as data 217, from one or more other applications 214 or 234. From among one or more rules, such as rules 218 stored in computer-readable medium 211 or a rule received from another application, notification application 213 may select a rule associated with the one or more other applications from which data was received, and may apply the data to the selected rule.

The notification application 213 may, for example, receive the rule from another application when the data is received, and may select a rule associated with both the other application and with the data. Notification application 213 may then apply the data to the selected rule. The application of the data to the selected rule may include determining a second data based on the data, and may involve applying the second data to the selected rule. Determining the second data may, for example, include performing a lookup, and the lookup may be specified by the selected rule.

Based on the application of the data to the selected rule, the notification application 213 may provide a notification. The notification may include an audio output provided through audio output device 221, and may include a first part associated with predefined text, such as predefined text included in the selected rule, and a second part associated with the data or with the second data.

The notification may further involve the performance of an action by the notification application 213, the action being specified in the selected rule. As part of providing a notification based on applying the data to the selected rule, the notification application 213 may perform a text-to-speech operation on a result of applying the data to the selected rule, and may perform the action specified in the selected rule.

Figure 3:
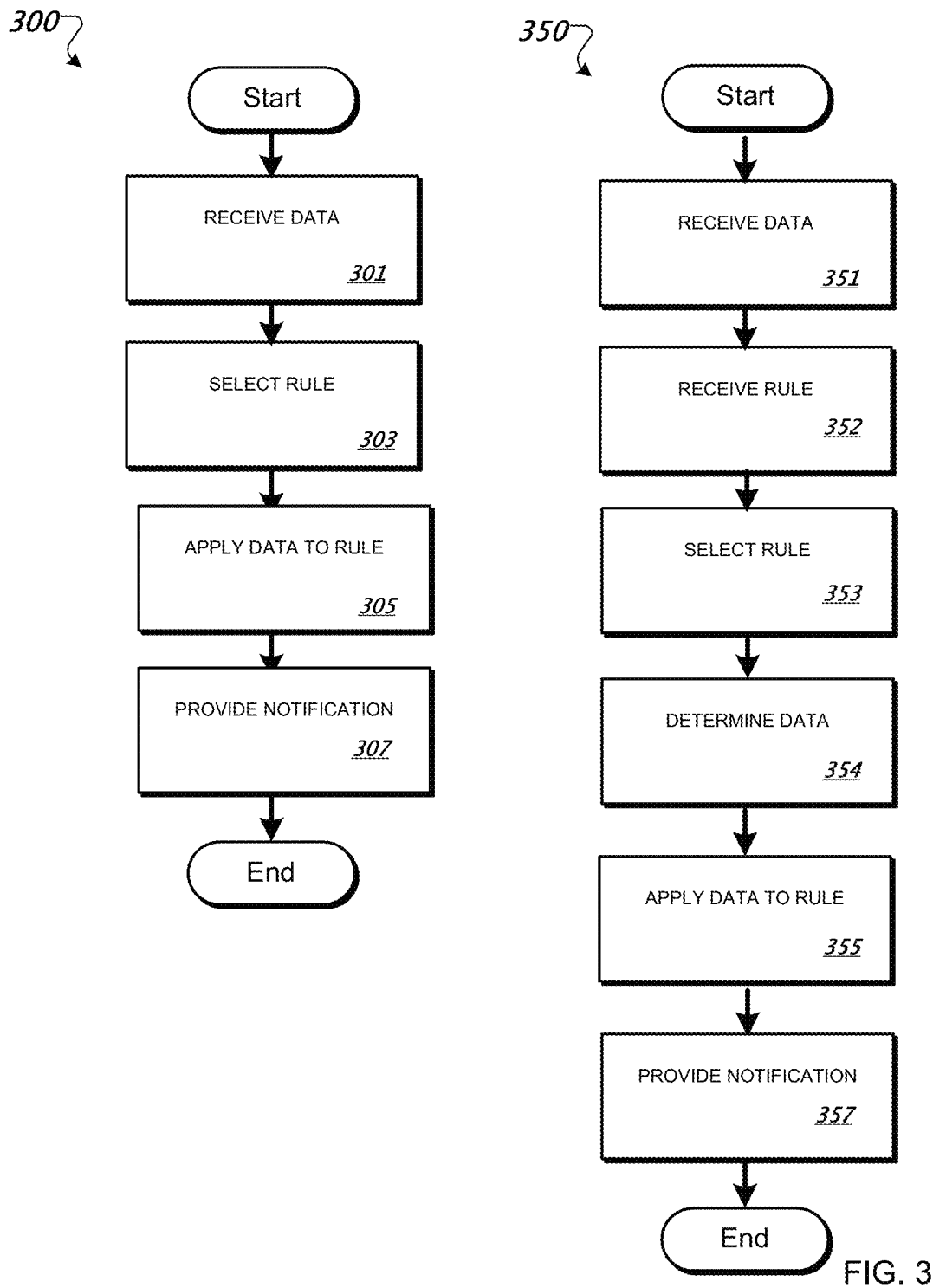
FIG. 3 features flowcharts of processes for providing audio notifications.

FIG. 3 features flowcharts of processes 300 and 350 for providing audio notifications. The processes 300 and 350 may be implemented, for example, using system 200.

Process 300 begins when a notification application executing on a computing device receives data from another application (301). The other application from which the data is received may run on the same computing device as the notification application, or may instead run on a different computing device. For example, the computing device on which the notification application executes may communicate with a server through one or more networks, and the data may be received from an application executing on the server.

A dynamic audio notification may include a combination of audio and non-audio elements, and the data received by the notification application may include information necessary to generate a notification involving synthesized speech, pre-generated or prerecorded audio, and visual or other elements. The data received by the notification application may include, for example, text elements for speech synthesis, audio files, image files, and instructions for generating other outputs.

The notification application selects, from among one or more rules, a rule associated with the other application (303). The one or more rules from which the rule is selected may be stored on a computer-readable medium of the computing device on which the notification application executes, may be stored on a computer-readable medium of a different computing device, or may be received from the other application. In some instances, the one or more rules may be stored on separate devices.

The selected rule is associated with the other application, but need not be application specific. For example, the notification application may determine the identity of the application from which data was received by referencing an application ID included in the data, and may select a rule based on the application ID. In some cases, a single rule may be associated with more than one application, and may be selected based on the application ID of the other application. If no rule specific to the other application is available, or if no application ID is included in the data, the notification application may instead select a default rule associated with all applications.

The notification application then applies the data to the selected rule (305). In some cases, the application of the data to the selected rule may involve the application of separate data elements. For example, the data received from the other application may include one or more separately identified data elements, and the selected rule may specify the manner in which the separately identified data elements can be applied.

Based on the application of the data to the selected rule, the notification application provides a notification (307). The notification may include an audio output, and may include a first part associated with predefined text and a second part associated with the data. Providing a notification based on applying the data to the selected rule may further include performing a text-to-speech operation on a result of applying the data to the rule.

Process 350 begins when a notification application executing on a computing device receives data from another application (351). Either separately or at the same time that the data is received, notification application receives a rule from the other application (352). The notification application selects a rule associated with the other application from among one or more rules (353). The notification application may select, for example, a rule that is associated with both the data and with the other application. The selected rule may be the received rule, may include predefined text, and may specify an action to be performed by the notification application, such as a lookup.

The notification application determines data (354) and applies the determined data to the selected rule (355). For example, the notification application may determine a second data by performing a lookup specified in the selected rule, and may then apply the second data to the selected rule. Based on applying the determined data to the selected rule, the notification application provides a notification (357). The notification application may, for example, provide a notification that includes an audio output including a first part associated with predefined text and a second part associated with the determined data. Providing the notification may involve, for example, performing a text-to-speech operation on a result of applying the data to the rule.

Figure 4:
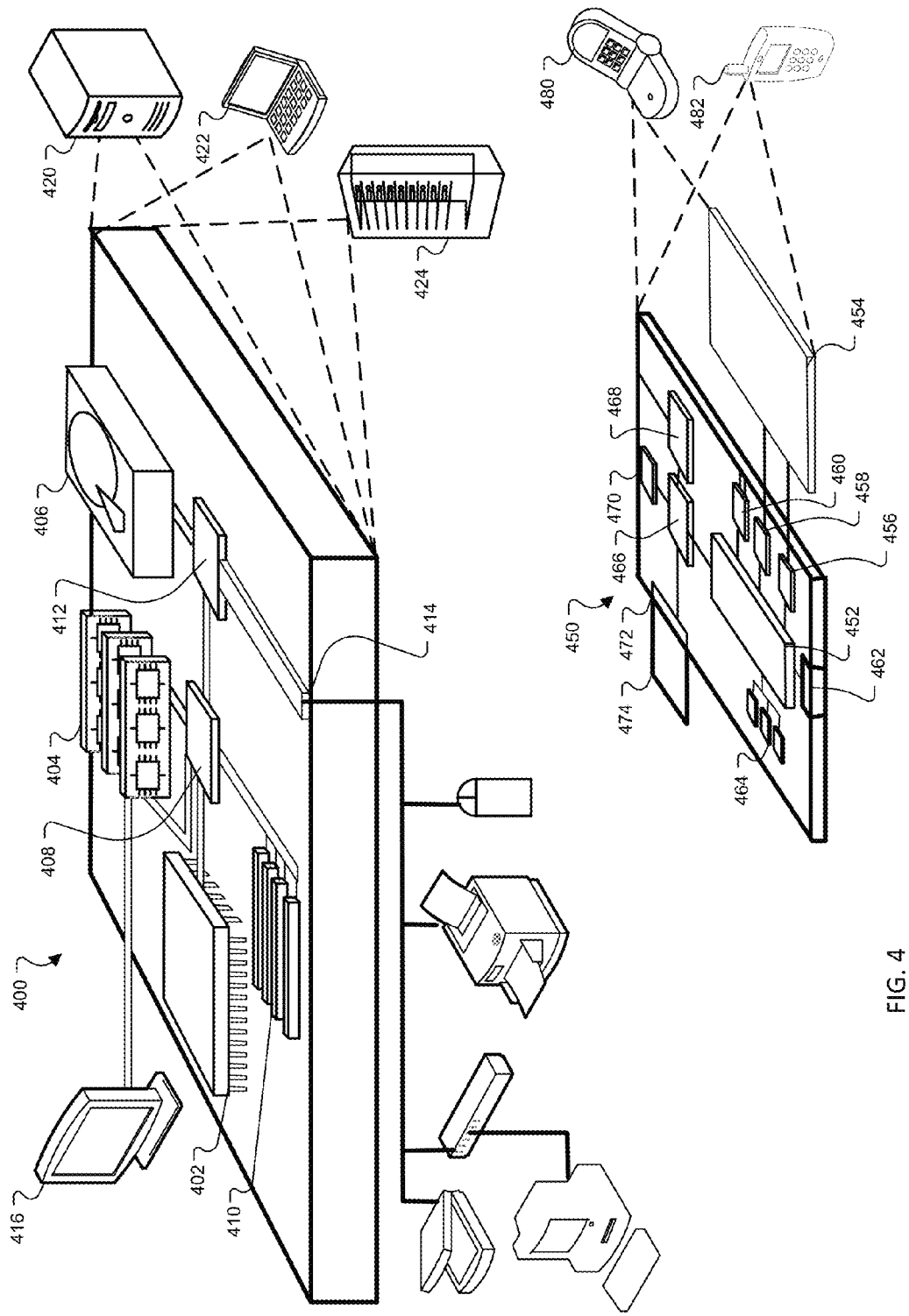
FIG. 4 shows example computer devices which may be used to provide audio notifications.

FIG. 4 shows an example of a generic computer device 400 and a generic mobile computer device 450, which may be used to implement the processes described herein. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable medium, such as the memory 404, the storage device 406, memory on processor 402, or a propagated signal. For example, the information carrier may be a non-transitory, machine-readable storage medium.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a manner that is not modifiable by the end-user.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wi-Fi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A computer-readable storage medium storing software comprising instructions executable by one or more computers which, upon such execution, cause the one or more computers to perform operations comprising:
   receiving, by a notification application executing on a mobile device, data from another application;
   selecting, by the notification application, a rule associated with the other application, from among one or more rules for each of multiple application based on the data and the other application;
   applying, by the notification application, the data to the selected rule;
   based on applying the data to the selected rule, obtaining a first component associated with predefined text and a second component associated with the data; and
   providing a notification that includes the first component and the second component to a speech synthesizer.

2. The computer-readable storage medium of claim 1, further comprising:
receiving, by the notification application, a rule from the other application.

3. The computer-readable storage medium of claim 2, wherein the rule received from the other application is received when the data is received.

4. The computer-readable storage medium of claim 1, wherein the selected rule includes predefined text.

5. The computer-readable storage medium of claim 1, wherein the selected rule specifies an action to be performed by the notification application.

6. The computer-readable storage medium of claim 1, wherein selecting a rule associated with the other application further comprises selecting a rule associated with both the other application and with the data.

7. The computer-readable storage medium of claim 1, wherein applying the data to the selected rule further comprises determining a second data based on the data and applying the second data to the selected rule.

8. The computer-readable storage medium of claim 7, wherein determining the second data further comprises performing a lookup.

9. The computer-readable storage medium of claim 8, wherein the lookup is specified by the selected rule.

10. The computer-readable storage medium of claim 1, wherein the notification comprises an audio output.

11. The computer-readable storage medium of claim 1, wherein providing a notification based on applying the data to the selected rule further comprises performing a text-to-speech operation on a result of applying the data to the rule.

12. A computer-implemented method comprising:
receiving, by a notification application executing on a mobile device, a request from another application to provide a notification, wherein the request includes notification data;
selecting, by the notification application, a rule associated with the other application and with the notification data received from the other application, from among one or more rules for each of multiple applications based on the notification data and the other application;
determining, by the notification application, a static component of a notification based on the selected rule, the static component including predefined text;
determining, by the notification application, a dynamic component of the notification by applying the notification data received from the other application to the selected rule; and
providing, by the notification application, the notification to a speech synthesizer, wherein the notification comprises the static component and the dynamic component.

13. The method of claim 12, wherein the selected rule specifies an action to be performed by the notification application.

14. The method of claim 12, wherein the notification comprises an audio output.

15. A system comprising:
one or more computers and one or more storage devices storing instructions that, when executed by the one or more computers, cause the one or more computers to perform operations comprising:
receiving, by a notification application executing on a mobile device, data from another application;
selecting, by the notification application, a rule associated with the other application, from among one or more rules for each of multiple applications based on the data and the other application;
dynamically determining a component of a notification by applying, by the notification application, the data received from the other application to the selected rule; and
providing, by the notification application, the notification to a speech synthesizer, wherein the notification comprises at least two components, and wherein at least one of the at least two components is the dynamically determined component.

16. The system of claim 15, wherein the selected rule includes predefined text.

17. The system of claim 15, wherein the selected rule specifies an action to be performed by the notification application.

18. The system of claim 15, wherein the notification comprises an audio output.

* * * * *

UNITED STATES PATENT AND TRADEMARK OFFICE
CERTIFICATE OF CORRECTION

| | | |
|---|---|---|
| PATENT NO. | : 8,478,867 B1 | Page 1 of 1 |
| APPLICATION NO. | : 13/566028 | |
| DATED | : July 2, 2013 | |
| INVENTOR(S) | : Jean Baptiste Maurice Queru | |

It is certified that error appears in the above-identified patent and that said Letters Patent is hereby corrected as shown below:

In the Claims

Column 10, line 59, Claim 1, please delete "application" and insert therefor -- applications --.

Signed and Sealed this
First Day of October, 2013

Teresa Stanek Rea
*Deputy Director of the United States Patent and Trademark Office*